United States Patent [19]
Hsu et al.

[11] 3,887,340
[45] June 3, 1975

[54] METHOD FOR SCRUBBING GASES DERIVED FROM BASIC OXYGEN FURNACES

[75] Inventors: Yuan Tsun Hsu, Cornwells Heights; K. Robert Lange, Huntingdon Valley, both of Pa.

[73] Assignee: Betz Laboratories, Inc., Trevose, Pa.

[22] Filed: Aug. 29, 1974

[21] Appl. No.: 501,574

[52] U.S. Cl. .................................................. 55/72
[51] Int. Cl. ............................................. B01d 47/06
[58] Field of Search ............... 55/68, 71, 73, 84, 85, 55/72; 252/182, 193

[56] References Cited
UNITED STATES PATENTS
3,633,340  1/1972  Illingworth ............................. 55/90

Primary Examiner—Charles N. Hart
Assistant Examiner—Ethel R. Cross
Attorney, Agent, or Firm—Alexander D. Ricci

[57] ABSTRACT

The present invention is directed to a method of scrubbing waste flue gases derived from basic oxygen furnace steel producing operations. The invention specifically calls for the spraying of the flue gases with an aqueous medium containing the combination comprising in a weight ratio basis of 1:10 to 10:1 of a substantially linear watersoluble sulfonated polystyrene and an organo-phosphonic acid derivative having the structural formula $(X)_2N-R-N(X)_2$ where R is a lower alkyl of from 1 to 7 carbon atoms, X is hydrogen or the group — $CH_2PO_3M_2$, where M is a water-soluble cation, the compound being further characterized in that at least one but preferably all X's are — $CH_2PO_3M_2$. In certain instances it is desirable to use in conjunction with the invention a water-soluble ligno-sulfonate.

7 Claims, No Drawings

METHOD FOR SCRUBBING GASES DERIVED FROM BASIC OXYGEN FURNACES

BACKGROUND OF THE INVENTION

During recent years, the number of wet scrubber systems installed to remove gaseous and particulate material from waste stack gases has increased tremendously. Additional such systems are on the drawing board now. These wet scrubbers are being used to clear effluent from boiler stacks, incinerator stacks, lime kilns, foundries, blast furnaces, basic oxygen furnaces (BOF), open hearth units, coke plants, paper mill recovery boilers, pet food manufacturing facilities, electric furnaces (steel and aluminum), smelters, asphalt plants and many others.

One of the most important features of a scrubber system is the contact chamber, the device used to effect transfer of gaseous and/or particulate matter from the gas to the water phase. Most wet scrubbers involve a venturi, a packed bed, an orifice plate, a spray chamber or a turbulent bed. Some systems even use two contact chambers in series, for example, a venturi followed by a spray chamber.

Venturi or orifice plate scrubbers are generally considered to be more efficient for particulate removal while packed beds, turbulent beds, and spray chambers are usually more efficient for removing gaseous components such as $SO_2$ and HF.

The present invention is directed specifically to those scrubber systems where scaling and deposition problems due to insoluble calcium fluoride and carbonate, iron oxide ($Fe_2O_3$ or $Fe_3O_4$) and slag fines containing small quantities of nickel, vanadium and chromium are encountered. The type problem which the present invention minimizes is that which is found in gas scrubber systems of basic oxygen operations where crude iron is being converted or processed to steel having a low carbon content.

In order to assure a complete understanding of the problem to which the present invention is addressed, a brief description of a basic oxygen furnace operation is hereafter provided.

In the production of steel, molten iron containing a high concentration of carbon derived from a blast furnace operation is fed through the top of a basic oxygen furnace. An oxygen stream is blown at periodic times and for a period of time (referred to as "blows") into the furnace and in contact with the molten iron. Additional ingredients such as dolomite and fluorspar are then added to the molten medium to form a predetermined type slag. The combination of high temperatures and the oxygen reduces the carbon to produce the purer form of steel. The molten steel is then tapped from the bottom of the furnace while the remaining slag is tapped from the middle of the furnace. The by-product of the carbon reduction is of course a combination of carbon dioxide, carbon monoxide, fluorides, each of which react with the calcium available in the scrubbing operation to form the troublesome scale-formers, calcium carbonate and calcium fluoride.

As can be appreciated, the velocity of the oxygen stream of the blow contributes significantly to the impurity content of the flue gas, thus putting an extreme burden on the scrubbing system. The particulate load in the scrubbing medium ranges from about 1000 to 1000 parts per million because of the particulate load of the flue gas. Between blows the particulate load is significantly lower.

The scrubbers that are used in basic oxygen furnace cleanup are often of the Venturi design and treat the off-gases from the furnace. These gases contain significant quantities of iron oxide, whose fine particle size allows it to be carried off in the gas stream. Also present may be fines, to a lesser extent and to some extent, particulate slag materials used, such as silicates, and unused dolomites and fluorspar. The iron oxide has been subjected to high temperatures during the oxygen conversion occurring within the furnace and may therefore be in a sintered form of low surface activity. However, its fine particle size presents deposition problems in scrubbers and delivery lines.

Although each of the various particulates contributes to the overall problem, the most significant factor was believed to be the highly calcined iron oxide ($Fe_3O_4$) content of the flue gas.

Since it was the present inventors' belief that if the combination iron oxide, calcium fluoride and calcium carbonate deposition problems could be minimized, the overall effectiveness, safety, and, of course, the economics of the scrubbing system would be greatly enhanced. Accordingly they engaged in a research program designed to produce a method of minimizing deposition of the nature described.

During this program, it was discovered that if a combination comprising a weight ratio of from about 1:10 to about 10:1 and preferably 1:7 to 7:1, of a water-soluble substantially linear sulfonated polystyrene having a molecular weight of from about 1,000 to 100,000 and preferably from 70,000 to 100,000, and an organo-phosphonate having the formula: $(X)_2 N - R - N (X)_2$, where R is a lower alkylene of from 1 to 7 carbon atoms, and X is hydrogen or the group $-CH_2PO_3M_2$ where M is hydrogen or a water-soluble cation such as sodium, potassium or ammonium, the compound being further characterized in that at least one but preferably all X's are $-CH_2PO_3M_2$ groupings, were added to the scrubbing medium in an amount of from 0.5 to about 300, and preferably from about 1 to about 75 ppm, that the deposition of iron oxide ($Fe_3O_4$) calcium carbonate and calcium fluoride could be effectively controlled so as to permit a more effective scrubbing operation. The polystyrene polymers found to be most effective were those which have been sulfonated to from about 50% to 100% with the greater degree of sulfonation being preferred. The phosphonates which possess enhanced activity are those having the shorter carbon chain as represented by R.

In certain instances, it is desirable and most advantageous to include in the treatment water-soluble ligno-sulfonic acid or the alkali metal or ammonium salts thereof to disperse the suspended particles such as iron oxide and calcium fluoride, etc. The addition of this material is particularly desirable where the removal of earlier formed deposits is necessary. The sulfonate is preferably included in an amount ranging from 1% to 50% by weight of the combination weight of the phosphonate and polystyrene compounds.

In order to test the efficacy of the invention's compositions, they were subjected not only to simulated testing in the laboratory, but also tested in basic oxygen furnace scrubber systems operating under production conditions. The individual tests are described and characterized hereinafter.

LABORATORY PACKED BED SCRUBBER TEST

The test conducted in accordance with the following was designed and performed to establish the effectiveness of the inventive compositions on the calcium carbonate problems which are normally experienced in basic oxygen furnace scrubber operations.

The scrubber which was designed to simulate a packed-bed scrubber was made from a 1,000 cc glass reaction kettle. Glass beads of 5 vertically mm diameter were used as packing material and these were supported inside the scrubber by a stainless steel screen. The whole system consists of the scrubber, the hot air and the warm liquid processing units. The compressed air flows through a pressure regulator, a flowmeter, a tube heater, in that order before it enters the scrubber at the bottom. It is vented at the top of the scrubber after bubbling through the packed-bed. The test solutions are pumped separately through coil immersed in a water bath and are mixed at the inlet of the scrubber. A glass tube inserted vertially through the center of the packed-bed guides the mixed solution to the bottom of the scrubber just above the air entrance so that it is forced upward through the bed by the bubbling air. The liquid is drained through an aspirator with the suction tube located approximately one inch above the bed. The test conditions used for the testing were as follows:

| | |
|---|---|
| Total Hardness | 200 ppm $CaCO_3$ |
| pH | 10.4 |
| Temperature | 50°C |
| Flow-rate | 60cc/min |

The hardness was produced by introducing sufficient quantities of calcium chloride ($CaCl_2$) and sodium carbonate ($Na_2CO_3$) in the circulating water within the scrubber.

The conditions of operation were chosen so as to promote (without treatment) the deposition of substantially all of the hardness contained in the water. Accordingly the effectiveness of any treatment could be measured by adding the treatment to the circulating water of the scrubber at the same time as the calcium chloride and the sodium carbonate were added.

The treatment of Product A as used in accordance with the test and the tests eventually used in the actual spray mediums of the scrubber system was produced by dissolving on a weight basis the following materials -

| Product A | |
|---|---|
| 5.0% | Sulfonated Polystyrene (90% sulfonation = molecular weight = 70,000) |
| 8.75% | $(H_2O_3PCH_2)_2 - N - (CH_2)_6 - N - (CH_2PO_3H_2)_2$ |
| 1.1% | Sodium hydroxide (pH control) |
| 85.15% | Water |

The test results for the treatment dosages were found to be as follows:

TABLE I

| Dosage of Product A (ppm) | Percentage Inhibition |
|---|---|
| 15 | 83.2 |
| 25 | 98.8 |
| 100 | 98.8 |

The results indicated that the combination of the invention was quite satisfactory in performing the function. Because of these results it was decided that the product would be evaluated under field scrubber conditions.

Testing Under Actual Field Conditions

From the laboratory data determined, it was concluded that if the aqueous system of the scrubber contained a chemical or product which would not only control the agglomeration and deposition of particles contained in the flue gas but also controlled the formation of other potentially undesirable scale for example calcium fluoride and calcium carbonate, the scrubber operation could be run more effectively. Accordingly it was concluded that an actual field evaluation would establish firmly whether this determination was correct.

An eastern steel producer was experiencing dust collection, scaling and deposition upon the structural parts and the piping of the scrubber system. An analysis of the dust deposits established that the dust was comprised primarily of ferric oxides in combination with calcium fluoride, calcium carbonate and various other calcium and metal salts.

Because of the rather large quantity of particulate matter observed during the visual evaluation of the scrubber system, it was concluded that a treatment comprising 8 parts per million of Product A and 2.5 parts per million of sodium lignosulfonate (dispersant) would be the most feasible treatment.

The treatment program was begun on the morning of Day 1 with, for comparison purposes, the flue gases being sprayed with the aqueous system containing the treatment as above described during some runs and in other runs the gases being sprayed with water having no treatment. The oxygen blows were taking place at approximately 45 minute intervals with occasional short reblows in between.

600 ml samples were obtained from the scrubber effluent every six minutes of a blow. 500 ml of the sample was placed in a graduated cylinder for a settled volume test. Settled volumes were read after 10 minutes. Approximately 30 cc's of each sample was filtered through a 0.2 micron millipore filter and set aside for total hardness determination. pH readings were also taken on the filtered samples. Twelve samples were secured, at six minute intervals, encompassing more than one blow.

The intention of the Settled Volume Test was to provide an indication of the degree of dispersion due to the treatment. Larger settled volumes represent a more fully dispersed system. A poorly dispersed system will compact to a low settled volume, fairly independently of solids content.

The results of the Settled Volume Test are recorded in Table 2. Intervals when blows took place are denoted by the increased solids loading in the samples. During the two runs with the prescribed treatment on Day 2 and the morning of Day 3, settled volumes between 75 and 130 ml were obtained. At 12:00 noon on Day 3 treatment was suspended and two additional runs were made starting at 4:25 and 6:13 p.m. Those runs show lower settled volumes than in the presence of treatment. Without treatment the highest amount read was 60 ml during the height of a blow versus 75 and 130 ml with treatment. Settled sludge was much more fluid with treatment than without treatment.

The results of the settled volume test indicated that the treatment was dispersing the solids significantly.

Total hardness results on the filered samples are shown in Table 3. The two runs conducted in the presence of treatment showed total hardness values reaching 1,420 ppm (as calcium carbonate) at the height of the blow in run no. 1 and 1,380 ppm in run no. 2. Between blows the values tended to run between 250 and 500 ppm in the presence of treatment.

During runs with interrupted treatment, the highest values obtained were 860 and 780 ppm, which are approximately half the values obtained with treatment. Between blows the untreated system gives consistent values of about 250 ppm.

The total hardness data shows conclusively that the treatment is able to hold more calcium in solution. It should be noted also that the pH at the height of the blow during treatment was generally between 11 and 12 and the calculated Langeliers Saturation Index is approximately +4.5 (a very severe scale forming condition).

The pH is related to the frequency and extent of the blows showing pH between 7 and 12. The pH is driven upward by calcium oxide and other alkaline solids that are driven out of the furnace by the gas stream and there is a compensating effect due to the solubilizing of $CO_2$ and volatilized metal fluorides in the water.

At the start of the blow oxygen is introduced and ignition of the carbon takes place, hence $CO_2$ and carbon evolve and pH is lowered to about 7 (Table 3). The scrubber effluent was turbid and contained a large amount of suspended solids (see Table 2). After ignition the lime and spar are added which cause the pH of the quencher water to rise to 12 and the calcium concentration to increase.

SUMMARY OF RESULTS

A. Analytical Data

1. By means of a Settled Volume test it has been shown that increased dispersion of the solids is being achieved using the treatment presently being applied.
2. The treatments have been shown to hold additional calcium in solution up to a positive Langeliers Index of 4.5.
3. Chemical analyses have shown that both dispersion and crystallization inhibition was taking place.

B. Visual Observations

The area of the scrubber system experiencing the dust collection and deposition was inspected prior to testing. The inspection revealed a significant build-up of a hard deposit (6 inches to more than 1 foot thickness). The area was mechanically cleaned and inspected again. The area appeared to be fairly clean and the test was commenced. Treatment was continued for one month after the Settled Volume and Hardness testing was conducted. The system was once more inspected; the area which previously had experienced dust collection and deposition was found to be quite clean with the exception of small soft muddy deposits at the segment where deposition had been found to be quite significant.

C. The pH vascillation as illustrated in Table 4 as encountered in a typical scrubber system provides a variable which is difficult to handle. Basically the treatment provided must be able to perform its function in a pH range of perhaps 7 to 12, which is a rather significant range. Products have been found to be operable at specific pH's but the ultimate objective was to provide a treatment which would be operable over the vast range. The present treatment has in fact accomplished this.

TABLE 2

| Run | Treatment | Settled Volume (cc) vs Time (min.) Settled Vol. (cc) Minutes | | | | | |
|---|---|---|---|---|---|---|---|
| | | 0 | 6 | 12 | 18 | 24 | 30 |
| 1 | Yes | 0 | 60 | 130 | 30 | 55 | 0 |
| 2 | Yes | 0 | 10 | 75 | 40 | 40 | 10 |
| 3 | No | 0 | 10 | 40 | 60 | 25 | 10 |

TABLE 3

| Run | Treatment | Total (Hardness (ppm) vs Time (min.) Total Hardness (ppm) Minutes | | | | | | |
|---|---|---|---|---|---|---|---|---|
| | | 0 | 6 | 12 | 18 | 24 | 30 | 36 |
| 1 | Yes | 250 | 935 | 750 | 1500 | 375 | 500 | 500 |
| 2 | Yes | 250 | 375 | 500 | 625 | 700 | 550 | 1000 |
| 3 | No | 750 | 270 | 250 | 230 | 200 | 190 | 320 |

TABLE 4

| Typical pH/Time Behavior of Scrubber Effluent | |
|---|---|
| Time | pH |
| 0 | 10.75 |
| 6 | 10.40 |
| 12 | 7.0 |
| 18 | 11.75 |
| 24 | 8.75 |
| 30 | 8.5 |
| 36 | 12.0 |

Having thus described the invention, what is claimed is:

1. A method of scrubbing flue gases derived from a basic oxygen furnace used in steel production which comprises treating said gases with an aqueous medium containing from about 0.5 to 300 parts per million of a combination of
   i. a water soluble sulfonated polystyrene, and
   ii. a compound having the formula: $(X)_2 N - R - N(X)_2$, wherein R is a lower alkylene of from 1 to 7 carbon atoms, X is hydrogen or the group $- CH_2PO_3M_2$, where M is a water-soluble cation, the compound further characterized in that at least one and preferably all X's are $- CH_2PO_3M_2$ 2. A method according to claim 1 wherein the polystyrene and the compound are present in a weight ratio of 1:10 to 10:1.

3. A method according to claim 2 wherein the compound has the formula:

$$(M_2O_3P\ CH_2)_2 - N - (CH_2)_6 - N - (CH_2PO_3M_2)$$

4. A method according to claim 3 wherein the polystyrene has a molecular weight of from 1,000 to 100,000.

5. A method according to claim 4 wherein the polystyrene is 90% sulfonated and has a molecular weight of about 70,000.

6. A method according to claim 2 wherein a water-soluble lignosulfonic acid derivative is added to the aqueous medium in an amount ranging from about 1 to 50% of the weight of said combination.

7. A method according to claim 6 wherein the compound has the formula $(M_2O_3P\ CH_2)_2 - N - (CH_2)_6 - N - (CH\ 2PO_3M_2)_2$ and the polystyrene is 90% sulfonated with a molecular weight of about 70,000 and said derivative is sodium lignosulfonate.

* * * * *